(12) United States Patent
Covington et al.

(10) Patent No.: US 11,873,081 B2
(45) Date of Patent: Jan. 16, 2024

(54) SUPPLEMENTAL ENGINE POWER CONTROL

(71) Applicant: Bell Textron Inc., Fort Worth, TX (US)

(72) Inventors: Charles Eric Covington, Colleyville, TX (US); Chia-Wei Su, Lewisville, TX (US); Darren Gregory Lang, Dallas, TX (US); Thomas Parsons, Fort Worth, TX (US); Cody Earl Fegely, Irving, TX (US)

(73) Assignee: Textron Innovations Inc., Providence, RI (US)

( * ) Notice: Subject to any disclaimer, the term of this patent is extended or adjusted under 35 U.S.C. 154(b) by 358 days.

(21) Appl. No.: 17/342,963

(22) Filed: Jun. 9, 2021

(65) Prior Publication Data

US 2022/0396353 A1    Dec. 15, 2022

(51) Int. Cl.
*B64C 27/12* (2006.01)
*B64D 31/12* (2006.01)

(52) U.S. Cl.
CPC .............. *B64C 27/12* (2013.01); *B64D 31/12* (2013.01)

(58) Field of Classification Search
CPC ......... B64C 27/12; B64C 27/06; B64D 31/12; B64D 27/00
See application file for complete search history.

(56) References Cited

U.S. PATENT DOCUMENTS

| | | | |
|---|---|---|---|
| 6,729,139 B2 | 5/2004 | Desai et al. | |
| 6,986,641 B1 | 1/2006 | Desai et al. | |
| 9,193,453 B2 | 11/2015 | Vallart et al. | |
| 9,821,908 B2 | 11/2017 | Schaeffer et al. | |
| 10,788,088 B2 | 9/2020 | Olson et al. | |
| 10,793,284 B2 | 10/2020 | Prater et al. | |
| 2003/0094001 A1 | 5/2003 | Desai et al. | |
| 2014/0252158 A1 | 9/2014 | Schaeffer | |
| 2014/0363288 A1 | 12/2014 | Schaeffer et al. | |

(Continued)

FOREIGN PATENT DOCUMENTS

| EP | 3693271 A1 | 8/2020 |
|---|---|---|
| WO | WO-2016049030 A1 | 3/2016 |

OTHER PUBLICATIONS

Covington, Charles Eric, et al.; "Supplemental Engine Transition Control"; U.S. Appl. No. 17/721,015, filed Apr. 14, 2022; 53 pages.

(Continued)

*Primary Examiner* — Yuen Wong
(74) *Attorney, Agent, or Firm* — Bradley Arant Boult Cummings LLP

(57) ABSTRACT

A rotorcraft has a drive system including a main rotor coupled to a main rotor gearbox to rotate the main rotor at a rotor speed, a main engine coupled to the drive system to provide a first power, a supplemental engine coupled, when a first clutch is engaged, to the drive system to provide a second power additive to the first power, and a control system operable to control the main engine and the supplemental engine to provide a total power demand, where the main engine is controlled based on variations in rotor speed and a power compensation command to produce the first power, and the supplemental engine is controlled to produce the second power in response to a supplemental power demand.

18 Claims, 4 Drawing Sheets

(56) References Cited

U.S. PATENT DOCUMENTS

| | | |
|---|---|---|
| 2016/0069277 A1 | 3/2016 | Meisner et al. |
| 2017/0066541 A1 * | 3/2017 | Rossotto |
| 2017/0225794 A1 * | 8/2017 | Waltner ............... F01D 13/00 |
| 2017/0297695 A1 | 10/2017 | Schaeffer et al. |
| 2018/0222597 A1 | 8/2018 | Covington et al. |
| 2019/0155282 A1 | 5/2019 | Kim |
| 2020/0248760 A1 | 8/2020 | Olson et al. |

OTHER PUBLICATIONS

Parsons, Thomas Dewey, et al.; "Optimizing Usage of Supplemental Engine Power"; U.S. Appl. No. 17/867,231, filed Jul. 18, 2022; 60 pages.

* cited by examiner

SUPPLEMENTAL ENGINE POWER CONTROL

STATEMENT REGARDING FEDERALLY SPONSORED RESEARCH OR DEVELOPMENT

This invention was made with government support under Agreement No. W911W6-19-9-0002, awarded by the U.S. Army Contracting Command-Redstone Arsenal. The government has certain rights in the invention.

TECHNICAL FIELD

This disclosure relates in general to the field of aircraft, and more particularly, but not by way of limitation, to managing the distribution of power between main and supplemental engines.

BACKGROUND

This section provides background information to facilitate a better understanding of the various aspects of the disclosure. It should be understood that the statements in this section of this document are to be read in this light, and not as admissions of prior art.

Conventionally, certain rotorcraft have employed some level of rotor speed control in a fly-by-wire flight control system. For example, rotor speed can be controlled by an engine control unit. However, controlling rotor speed with the engine control unit of a supplemental engine may have shortcomings.

SUMMARY

An exemplary rotorcraft has a drive system including a main rotor coupled to a main rotor gearbox to rotate the main rotor at a rotor speed, a main engine coupled to the drive system to provide a first power, a supplemental engine coupled, when a first clutch is engaged, to the drive system to provide a second power additive to the first power, and a control system operable to control the main engine and the supplemental engine to provide a total power demand, where the main engine is controlled based on variations in rotor speed and with a power compensation command to produce the first power, and the supplemental engine is controlled to produce the second power in response to a supplemental power demand.

An exemplary method includes operating a rotorcraft comprising a drive system having a main rotor coupled to a main rotor gearbox, a main engine applying a first power to the drive system, and a supplemental engine applying a second power, additive to the first power, to the drive system when a first clutch is engaged, determining a total power demand to drive the main rotor at a rotor speed, the governing comprising using, by the main engine, a power compensation command received in response to variation in the rotor speed, providing the first power to the drive system in response to the power compensation command, controlling the supplemental engine with a supplemental power demand, and providing the second power in response to the supplemental power demand.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
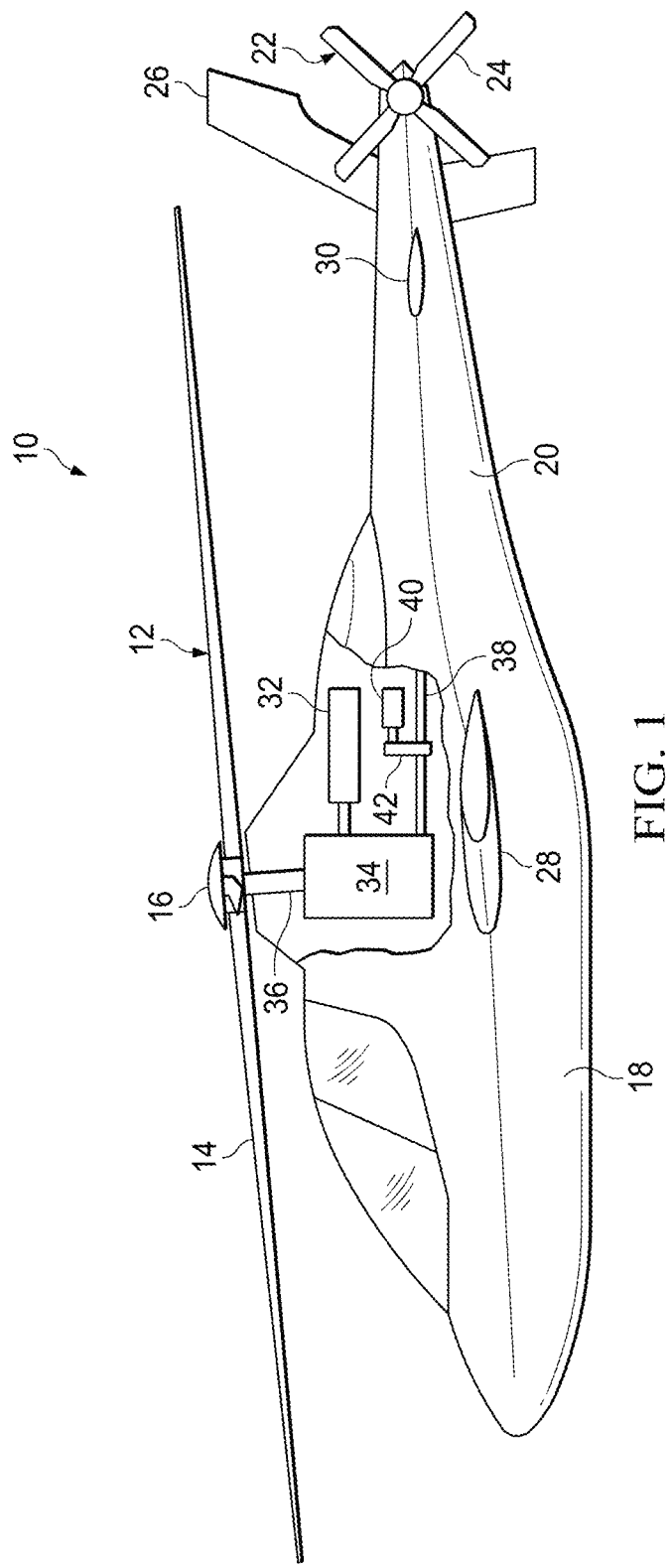
FIG. 1 is a schematic illustration of an exemplary rotorcraft implementing a supplemental engine power control system according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

Referring to FIG. 1, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust, and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provides stabilization to helicopter 10 during high-speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10.

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a supplemental engine 40, or supplemental power unit, is coupled to tail rotor drive shaft 38 by a supplemental engine gearbox 42 that provides suitable clutching therebetween. Together, main engine 32, main rotor gearbox 34, tail rotor drive shaft 38, supplemental engine 40 and supplemental engine gearbox 42 as well as the various other shafts and gearboxes coupled therein may be considered as a torque-summing powertrain of helicopter 10.

Supplemental engine 40 is operable as an auxiliary power unit to provide preflight power to the accessories of helicopter 10 such as electric generators, hydraulic pumps, and the like as well as to provide the power required to start main engine 32. In addition, supplemental engine 40 is operable to provide supplemental power that is additive with the power provided by main engine 32.

Rotorcraft 10 is merely illustrative of a variety of aircraft that can implement the embodiments disclosed herein. Indeed, the torque-summing powertrain of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, and the like. As such, those skilled in the art will recognize that the torque-summing powertrain of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2:
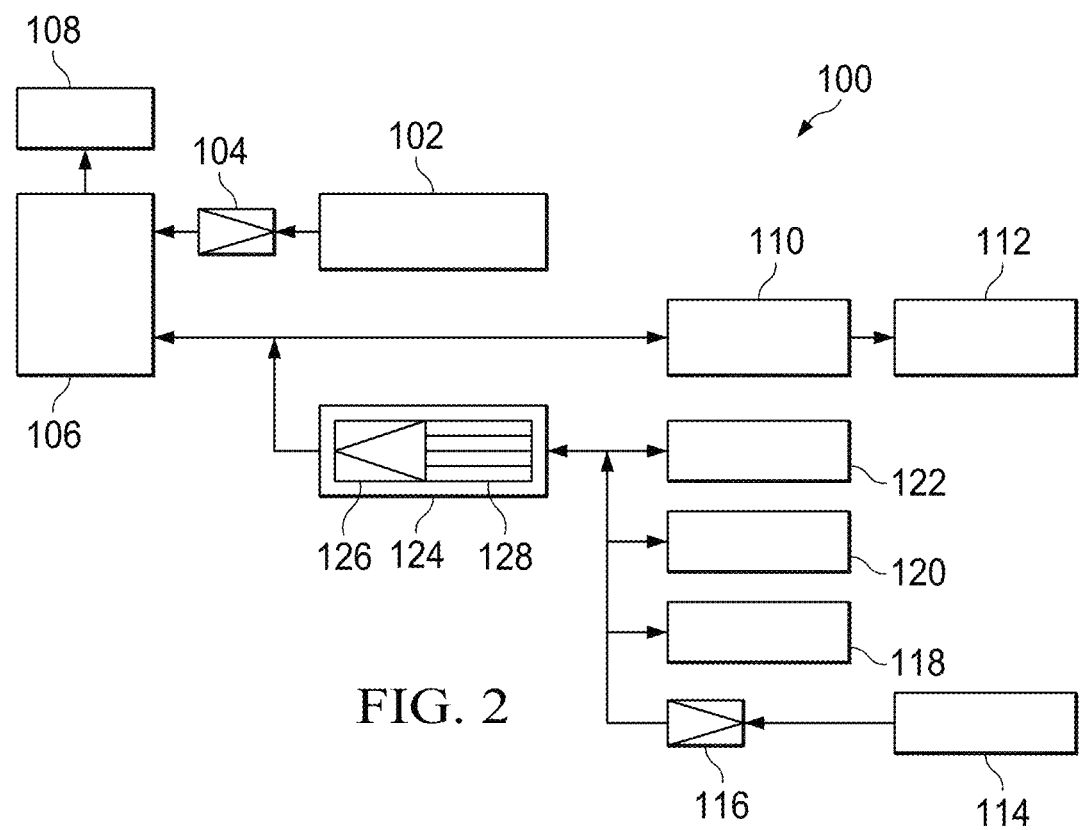
FIG. 2 is block diagram illustrating an exemplary main engine and supplemental engine torque-summing powertrain according to one or more aspects of the disclosure.

Referring also to FIG. 2, an exemplary torque-summing powertrain 100 for a rotorcraft is illustrated in a block diagram format. Torque-summing powertrain 100 includes a main engine 102 such as a turboshaft engine capable of producing 2,000 to 4,000 horsepower or more, depending upon the particular implementation. Main engine 102 is coupled to a freewheeling unit depicted as sprag clutch 104 that acts as a one-way clutch enabling a driving mode, wherein torque from main engine 102 is coupled to main rotor gearbox 106 when the input side rotating speed to sprag clutch 104 is matched with the output side rotating speed from sprag clutch 104. For convenience of illustration, the input side of sprag clutch 104 is depicted as the apex of the greater than symbol and the output side of sprag clutch 104 is depicted as the open end of the greater than symbol. Importantly, sprag clutch 104 has an overrunning mode where main engine 102 is decoupled from main rotor gearbox 106 when the input side rotating speed of sprag clutch 104 is less than the output side rotating speed of sprag clutch 104. Operating sprag clutch 104 in the overrunning mode allows, for example, main rotor 108 of helicopter 10 to engage in autorotation in the event of a failure of main engine 102.

In the illustrated embodiment, main rotor gearbox 106 is coupled to sprag clutch 104 via a suitable drive shaft. In addition, main rotor gearbox 106 is coupled to main rotor 108 by a suitable mast. Main rotor gearbox 106 includes a gearbox housing and a plurality of gears, such as planetary gears, used to adjust the engine output to a suitable rotational speed so that main engine 102 and main rotor 108 may each rotate at optimum speed during flight operations of helicopter 10. Main rotor gearbox 106 may be coupled to a tail rotor gearbox 110 via a suitable tail rotor drive shaft. Tail rotor gearbox 110 includes a gearbox housing and a plurality of gears that may adjust the main rotor gearbox output to a suitable rotational speed for operation of tail rotor 112. Main engine 102, sprag clutch 104, main rotor gearbox 106 and tail rotor gearbox 110 as well as the various shafts and gearing systems coupled therewith may be considered the main drive system of torque-summing powertrain 100.

Torque-summing powertrain 100 includes a supplemental engine 114 such as a turboshaft engine capable of producing 200 to 600 horsepower or more, depending upon the particular implementation. In the illustrated embodiment, supplemental engine 114 may generate between about 5 percent and about 20 percent of the horsepower of main engine 102. In other embodiments, supplemental engine 114 may generate between about 10 percent and about 15 percent of the horsepower of main engine 102. Supplemental engine 114 is coupled to a freewheeling unit depicted as sprag clutch 116 that acts as a one-way clutch enabling a driving mode, wherein torque from supplemental engine 114 is coupled through sprag clutch 116 from the input side to the output side. Sprag clutch 116 has an overrunning mode wherein supplemental engine 114 is decoupled from torque transfer with sprag clutch 116 when the input side rotating speed of sprag clutch 116 is less than the output side rotating speed of sprag clutch 116. Operating sprag clutch 116 in the overrunning mode allows, for example, main engine 102 to drive the rotorcraft accessories such as one or more generators 118, one or more hydraulic pumps 120 or other accessories 122 when supplemental engine 114 is not operating. Supplemental engine 114 and sprag clutch 116 as well as the various shafts and gearing systems coupled therewith may be considered the secondary drive system of torque-summing powertrain 100.

Disposed between the main drive system and the secondary drive system of torque-summing powertrain 100 is a selectable clutch assembly 124 that has a unidirectional torque transfer mode and a bidirectional torque transfer mode. In the unidirectional torque transfer mode of selectable clutch assembly 124, torque can be driven from the main drive system to the secondary drive system of torque-summing powertrain 100 but torque cannot be driven from the secondary drive system to the main drive system of torque-summing powertrain 100. In the bidirectional torque transfer mode of selectable clutch assembly 124, torque can be driven from the main drive system to the secondary drive system of torque-summing powertrain 100 and torque can be driven from the secondary drive system to the main drive system of torque-summing powertrain 100. In the illustrated embodiment, selectable clutch assembly 124 includes a freewheeling unit depicted as sprag clutch 126 and a bypass assembly 128. Sprag clutch 126 acts as a one-way clutch enabling a driving mode, wherein torque from the main drive system is coupled through sprag clutch 126 from the input side to the output side. Sprag clutch 126 also has an overrunning mode wherein the main drive system is decoupled from torque transfer with sprag clutch 126 when the input side rotating speed of sprag clutch 126 is less than the output side rotating speed of sprag clutch 126. When the overrunning mode of sprag clutch 126 is enabled, selectable clutch assembly 124 is in its unidirectional torque transfer mode. The overrunning mode of selectable clutch assembly 124 can be disabled by engaging bypass assembly 128 with sprag clutch 126. When bypass assembly 128 prevents sprag clutch 126 from operating in the overrunning mode, selectable clutch assembly 124 is in its bidirectional torque transfer mode.

When main engine 102 is operating, torque is delivered through the main drive system as indicated by the solid lines and arrowheads between the components within the main drive system. In addition, as the main drive system is turning, torque may be applied to selectable clutch assembly 124. As discussed herein, in order to shift selectable clutch assembly 124 from the unidirectional torque transfer mode to the bidirectional torque transfer mode, power should be applied to the input side of sprag clutch 126 from the main drive system such that the input side and the output side of sprag clutch 126 are turning together. Bypass assembly 128 can now be actuated from the disengaged position to the engaged position placing selectable clutch assembly 124 in the bidirectional torque transfer mode. The operations of engaging and disengaging bypass assembly 128 may be pilot controlled and/or may be automated by the flight control computer of helicopter 10 and may be determined according to the operating conditions of rotorcraft 10. In this configuration, power from supplemental engine 114 augments the power of main engine 102 within the main drive system, as indicated by the solid lines and arrowhead from selectable clutch assembly 124 to the main drive system. This configuration may be referred to as the enhanced power configuration of torque-summing powertrain 100 wherein main engine 102 and supplemental engine 114 are operating together and selectable clutch assembly 124 is in the bidirectional torque transfer mode. Selectable clutch assembly 124 may be engaged and additive supplemental power applied to the main rotor during normal operations in which the load that on the main engine is sufficient to govern the rotor speed. For example, selectable clutch assembly 124 may not be engaged if the supplemental power would reduce the load on the main engine below that in which the main engine can govern rotor speed. Aspects of powertrain 100 are disclosed in US patent publication 2020/0248760, the teaching of which are incorporated herein by reference.

Figure 3:
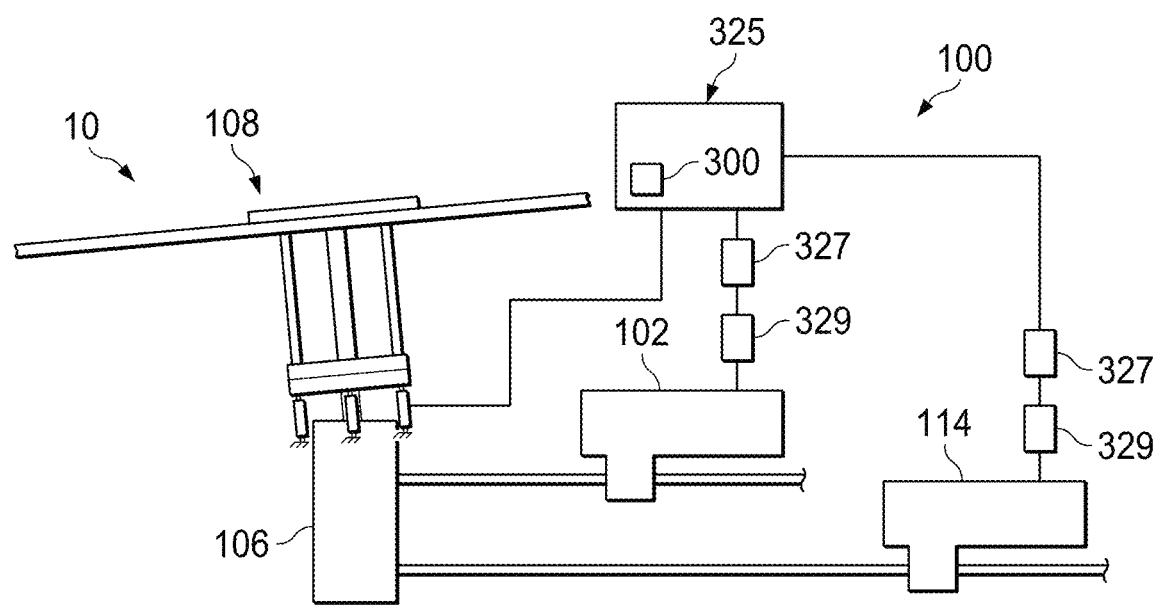
FIG. 3 is schematic illustration of a rotorcraft powertrain with an exemplary system for implementing supplemental engine power control.
Figure 4:
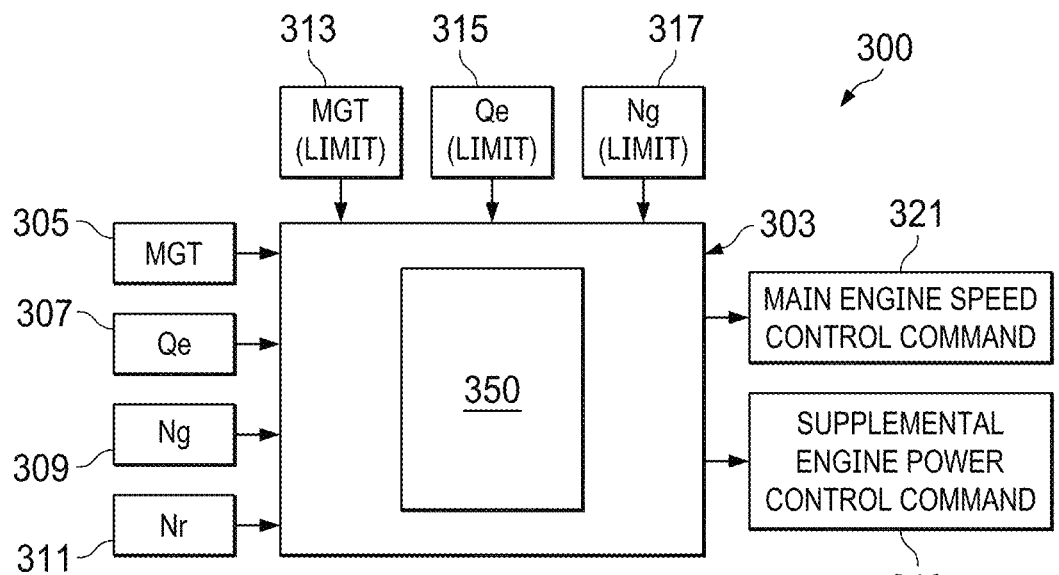
FIG. 4 is schematic illustration of a system for calculating and commanding rotor speed control of a main engine and commanding power control of a supplemental engine according to one or more aspects of the disclosure.

Referring now also to FIGS. 3 and 4, a system 300 is illustrated in conjunction with rotorcraft 10 and torque summing powertrain 100. It should be appreciated that though system 300 is illustrated with regard to rotorcraft 10, system 300 is equally implementable on other aircraft as well. Further, it should be appreciated that system 300 can be implemented in a wide variety of configurations, depending in part on the flight control configuration of the aircraft.

System 300 is particularly well suited for implementation in aircraft having a fly-by-wire flight control computer, such as flight control computer 325; however, non-fly-by-wire aircraft can also utilize system 300. For example, system 300 can be utilized in a flight control system having collective actuators that can receive commands from a trim motor, autopilot system, or any other system that allows collective commands to be realized by collective actuators. Further, system is particularly well suited for implementation with aircraft having engines controlled by an engine control unit 327, such as a FADEC (full authority digital engine control) system. However, system 300 can also be implemented on an aircraft having an engine that is not controlled by an engine control unit 327, in such an embodiment, system 300 can make fuel control commands directly to a fuel control unit 329, for example. System 300 is preferably integrated with flight control computer 325; however, in another embodiment system 300 can be a standalone computer system within the aircraft.

System 300 can include a processor 303 configured for processing receivable data in one or more algorithms 350 for calculating total power demand, supplemental power demands, and subsequently making commands, e.g., a main engine speed command, and supplemental engine power command, to adaptively affect rotor speed. Processor 303 can receive real time operational data from sensors, instrumentation, and the like. Processor 303 can receive real time data pertaining to a measured gas temperature (MGT) 305, engine torque (Qe) 307, engine gas generator speed (Ng) 309 approximating power, and main rotor speed (Nr) 311 which corresponds to the engine power turbine speed (Np). Allowable engine limits, for each of the main and the supplemental engine, such as measure gas temperature (MGT) limit 313, an engine gas generator speed (Ng) limit 317, as well as a torque (Qe) limit 315, are in data communication with processor 303. Allowable engine limits 313, 317, and torque limit 315, can be stored in a database within processor, or be stored remotely, as long as limits 313, 315, and 317 are available for the analysis. Processor 303 is configured to perform analysis using one or more algorithms and subsequently make supplemental engine power commands 319 and a main engine speed command 321.

Main engine 102 and supplemental engine 114 are different sizes, i.e., different horsepower ratings, and may be from different manufacturers. System 300 is configured to separately control the main engine and the supplemental engine to supply the total power required to maintain the main rotor speed within an acceptable range. System 300 controls main engine 102 to govern the main rotor speed (Nr), for example in similar manner as with a conventional single engine or twin-engine powertrain. System 300 implements supplemental engine 114 power control via Ng command to provide a proportion of the total power demand, which is subtracted from the main engine power compensation command. The supplemental engine only receives a supplemental power demand and does not respond to changes in rotor speed. System 300 facilitates operating the supplemental engine in the enhanced power configuration when the main engine's proportion of the total power demand is sufficient for the main rotor speed to be governed by the main engine.

A system computed main engine power compensation command is used to adjust the power output of the main engine to reduce rotor speed variation in response to load variations. The main engine power compensation command may be calculated by the system anticipating the power demand on the engine and transmitting the main engine power compensation command to the governor on the main engine to adjust the power output of the main engine. Non-limiting exemplary methods and systems for governing rotor speed are disclosed in US patent publications 2014/0252158, 2014/0363288, and 2018/0222597, the teachings of which are incorporated herein by reference.

The system controls the supplemental engine to provide a proportion of the total power demand. The supplemental engine provides power in response to a system computed supplemental engine power demand signal, effectively decoupling the dynamics of the main engine and the supplemental engine. The main engine power compensation command is adjusted to account for the supplemental engine power demand. The supplemental engine power demand can be computed as a function of control inputs and flight conditions or in proportion to the total power demand. The supplemental engine power demand may be computed per schedule and limits.

Figure 5:
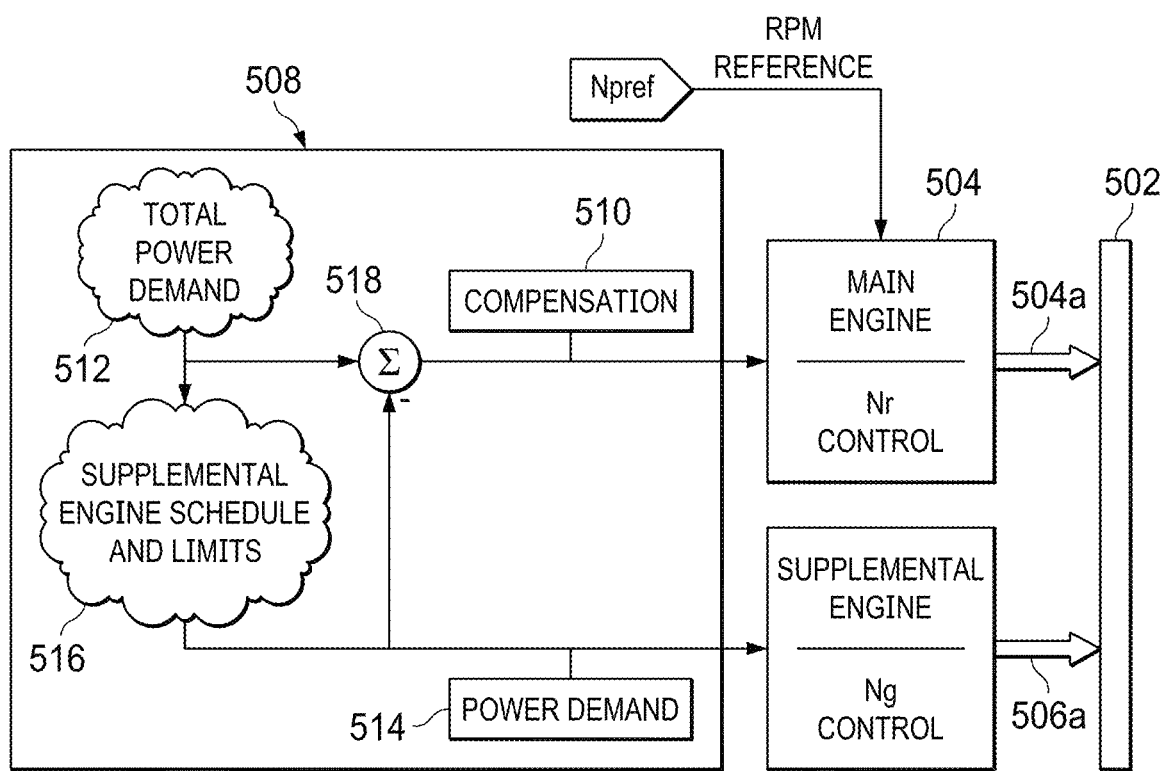
FIG. 5 is a schematic illustration of a rotorcraft implementing an exemplary supplemental engine power control system.

Referring also to FIG. 5, a rotorcraft 500 comprises a main rotor drive system 502, e.g., main rotor and main rotor gearbox, and a main engine 504 and a supplemental engine 506 coupled to the drive system. The supplemental engine is smaller than the main engine, for example, the supplemental engine may be 20 percent of the size of the main engine. A computer 508, e.g., flight computer, is configured to divide the control domain between the main engine and the supplemental engine. The main engine controls rotor speed (Nr) which is proportional to power turbine speed (Np), for example in a similar fashion to a traditional system with a single turboshaft engine or twin identical engines. Main engine 504 provides power to maintain the main rotor speed with a level of compensation for load variation. Main engine 504 has an engine controller that measures the main rotor speed (Nr) and adjusts main engine power 504*a* to reduce RPM variation in response to load variations. Computer 508 can communicate a power compensation command 510 to main engine, e.g., the power turbine, in anticipation of the load variations for example due to flight conditions, ambient conditions, and pilot inputs.

Supplemental engine 506 works to satisfy a power demand as opposed to the main engine which works to satisfy an RPM demand. Total power demand 512 is calculated for what the rotorcraft is currently doing and is routed toward the main engine as the power compensation command. A portion of total power demand 512 is allocated to the supplemental engine, as a supplemental engine power demand 514, based on logic 516 (e.g., schedules and limits). Different techniques can be used to control supplemental engine. For example, supplemental engine power demand 514 may be gas generator speed (Ng) based (demanding Ng is proportional to power), measured gas temperature (MGT) based (demanding a temperature), fuel flow (WF) based (demanding a rate of fuel flow), or engine torque (Qe) based (demanding a torque). Ambient correction and low frequency closed-loop correction may be applied to reduce errors, if necessary.

To mitigate supplemental engine power 506*a* from being perceived by the main engine as a disturbance, supplemental engine power demand 514 is subtracted at block 518 from total power demand 512, resulting in main engine power compensation command 510.

The schedules are built to achieve certain attributes. For example, and without limitation, the supplemental engine should be at maximum power when regard for efficiency in some flight envelopes and for safety. The supplemental power demand is forced to maximum power for autorotation if the main engine fails or due to rotor speed droop, which is indicative of a main engine failure. In low-power conditions, the supplemental engine power demand is reduced to ensure adequate load remains on the main engine so that it can continue to govern rotor speed. A low limit may be placed on the supplemental engine power demand to ensure that the supplemental engine sprag clutch, e.g., clutch 126 of selectable clutch 124, remains engaged. The high limit takes priority over the low limit during normal operation when the main engine is controlling rotor speed. Limits, gains, and other parameters can be varied with flight condition to optimize performance. Supplemental engine limiting loops, such as MGT, Ng, and Qe, may be utilized, and the system control algorithm adjusts when the limiting loops are active. The supplemental engine power demand control may have a power turbine speed (Np) loop in case of overspeed, for example about 3 percent, to switch the supplemental engine to rotor speed (RPM) command to avoid increasing the rotor overspeed.

Figure 6:
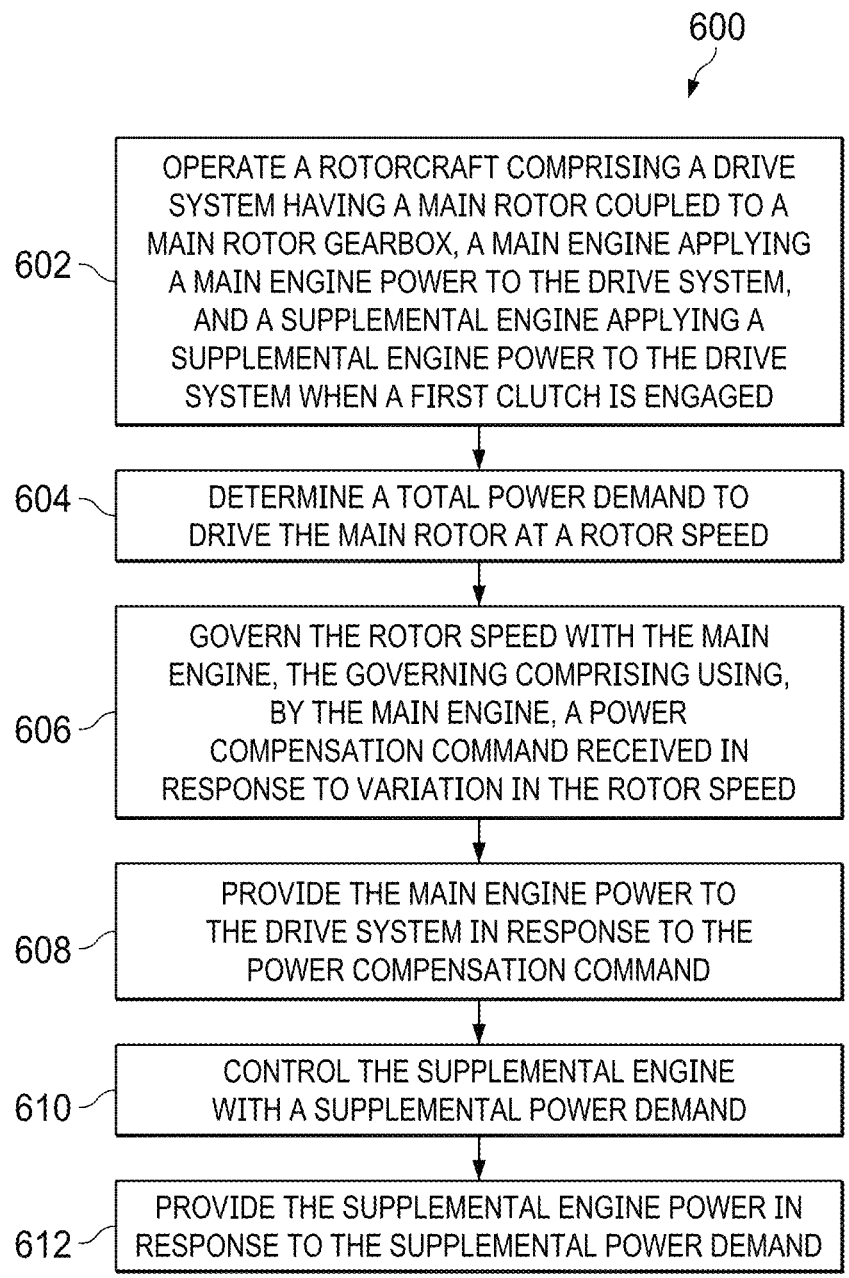
FIG. 6 is a flow diagram of an exemplary method of supplemental engine power control.

FIG. 6 illustrates an exemplary method 600 for power control of a supplemental engine, which is described with additional reference to FIGS. 1-5. At block 602, a rotorcraft is operated. The rotorcraft includes a drive system having a main rotor coupled to a main rotor gearbox. A main engine applies a main engine power to the drive system and a supplemental engine applies a supplemental engine power to the drive system when a first clutch, e.g., clutch 126 (FIG. 2), is engaged. At block 604, a total power demand, to drive the main rotor at a rotor speed, is determined. The total power demand accounts the main engine power and the supplemental engine power. At block 606, the main engine governs the rotor speed. The governing comprises, for example, using a power compensation command generated in response to anticipated load variations to reduce rotor speed variation. At block 608, the main engine power is provided to the drive system in response to receiving the power compensation command. At block 610, the supplemental engine is controlled with a supplemental power demand. At block 612, the supplemental engine power is provided to the drive system in response to the supplemental power demand.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotorcraft, comprising:
a drive system including a main rotor coupled to a main rotor gearbox to rotate the main rotor at a rotor speed;
a main engine coupled to the drive system to provide a first power;
a supplemental engine coupled, when a first clutch is engaged, to the drive system to provide a second power additive to the first power; and
a control system, comprising a processor, operable to control the main engine and the supplemental engine to provide a total power demand, wherein the main engine is controlled based on variations in the rotor speed and with a power compensation command to produce the first power, and the supplemental engine is controlled to produce the second power in response to a supplemental power demand;
wherein the control system imposes:
an upper supplemental power limit to maintain the first power at a first power level for the main engine to govern the rotor speed; and
a lower supplemental power limit to maintain the first clutch engaged;
wherein the upper supplemental power limit takes priority over the lower supplemental power limit during operation when the main engine is controlling the rotor speed.

2. The rotorcraft of claim 1, wherein the main engine has a greater horsepower rating than the supplemental engine.

3. The rotorcraft of claim 1, wherein the power compensation command is the total power demand reduced by the supplemental power demand.

4. The rotorcraft of claim 1, wherein the power compensation command is the total power demand reduced by the supplemental power demand; and
the main engine has a greater horsepower capacity than the supplemental engine.

5. The rotorcraft of claim 1, wherein the supplemental power demand is calculated as a proportion to the total power demand; and
the power compensation command is the total power demand reduced by the supplemental power demand.

6. The rotorcraft of claim 1, wherein the supplemental power demand is between about 5 and 20 percent of the total power demand.

7. The rotorcraft of claim 1, wherein the supplemental power demand is between about 10 and 15 percent of the total power demand.

8. The rotorcraft of claim 1, wherein the power compensation command is reduced by the supplemental power demand; and
the main engine has a greater horsepower rating than the supplemental engine.

9. A method, comprising:
operating a rotorcraft comprising a drive system having a main rotor coupled to a main rotor gearbox, a main engine applying a first power to the drive system, and a supplemental engine applying a second power to the drive system when a first clutch is engaged;
determining a total power demand to drive the main rotor at a rotor speed;
governing the rotor speed with the main engine, the governing comprising using, by the main engine, a power compensation command received in response to variation in the rotor speed;
providing the first power in response to the power compensation command;
controlling, by a processor of a control system, the supplemental engine with a supplemental power demand; and
providing the second power in response to the supplemental power demand imposing, by the processor of the control system, an upper supplemental power limit to maintain the first power at a first power level for the main engine to govern the rotor speed; and
imposing, by the processor of the control system, a lower supplemental power limit to maintain the first clutch engaged;
wherein the upper supplemental power limit takes priority over the lower supplemental power limit during operation when the main engine is controlling the rotor speed.

10. The method of claim 9, wherein the main engine has a greater horsepower rating than the supplemental engine.

11. The method of claim 9, wherein the main engine has a horsepower rating between about 2,000 to 4,000 horsepower and the supplemental engine has a horsepower rating between about 200 to 600 horsepower.

12. The method of claim 9, wherein the supplemental power demand is between about 5 and 20 percent of the total power demand.

13. The method of claim 9, further comprising computing the supplemental power demand as a function of flight conditions or in proportion to the total power demand; and
computing the power compensation command by reducing the total power demand by the supplemental power demand.

14. The method of claim 9, further comprising computing the supplemental power demand as a proportion of the total power demand; and
computing the power compensation command by reducing the total power demand by the supplemental power demand.

15. The method of claim 14, wherein the supplemental power demand is between about 5 and 20 percent of the total power demand.

16. The method of claim 9, wherein computing the power compensation command comprises reducing the total power demand by the supplemental power demand;

computing the supplemental power demand as a proportion of the total power demand; and pushing the supplemental engine to maximum power in response to the main engine out or rotor speed droop.

17. The method of claim 9, wherein computing the power compensation command comprises reducing the total power demand by the supplemental power demand; and computing the supplemental power demand as a proportion of the total power demand and a schedule.

18. The method of claim 17, the main engine has a horsepower rating between about 2,000 to 4,000 horsepower and the supplemental engine has a horsepower rating between about 200 to 600 horsepower.

* * * * *